United States Patent [19]

Pease

[11] 4,423,616

[45] Jan. 3, 1984

[54] METHOD OF MAKING SHEET METAL THREADED ARTICLE

[76] Inventor: James F. Pease, 7916 N. Congress Park Dr., Dayton, Ohio 45459

[21] Appl. No.: 419,837

[22] Filed: Sep. 20, 1982

Related U.S. Application Data

[62] Division of Ser. No. 182,072, Aug. 28, 1980, Pat. No. 4,363,581.

[51] Int. Cl.³ ............................................. B21D 22/00
[52] U.S. Cl. ........................................ 72/348; 72/356; 72/370
[58] Field of Search ................. 72/347, 348, 349, 370, 72/356

[56] References Cited

U.S. PATENT DOCUMENTS

| | | | |
|---|---|---|---|
| 2,980,993 | 4/1961 | Lyon | 72/348 |
| 2,999,312 | 9/1961 | Schilberg | 72/348 |
| 3,503,246 | 3/1970 | Shiokawa | 72/370 |
| 3,719,985 | 3/1973 | Federspill | 72/370 X |
| 4,343,174 | 8/1982 | Hahn | 72/349 |

Primary Examiner—Leon Gilden
Attorney, Agent, or Firm—Jacox & Meckstroth

[57] ABSTRACT

A thin sheet of metal is drawn in progressive steps to form a hollow body having a closed end tubular portion integrally connected to an outwardly projecting cup-shaped flange portion. A section of the tubular portion is crimped inwardly against a threaded mandrel to form helical threads and diametrically opposed and outwardly projecting double wall rib portions. The mandrel is unthreaded to form a sheet metal insert which is adapted to be supported within a mold cavity by a cylindrical support pin during injection of a plastics material into the cavity and around the insert. The threads and rib portions positively secure the sheet metal insert within the molded plastics article or part for receiving a threaded fastener. The insert may also be used in a metal part or casting or in a wood article, wherever threads are required or desirable.

11 Claims, 5 Drawing Figures

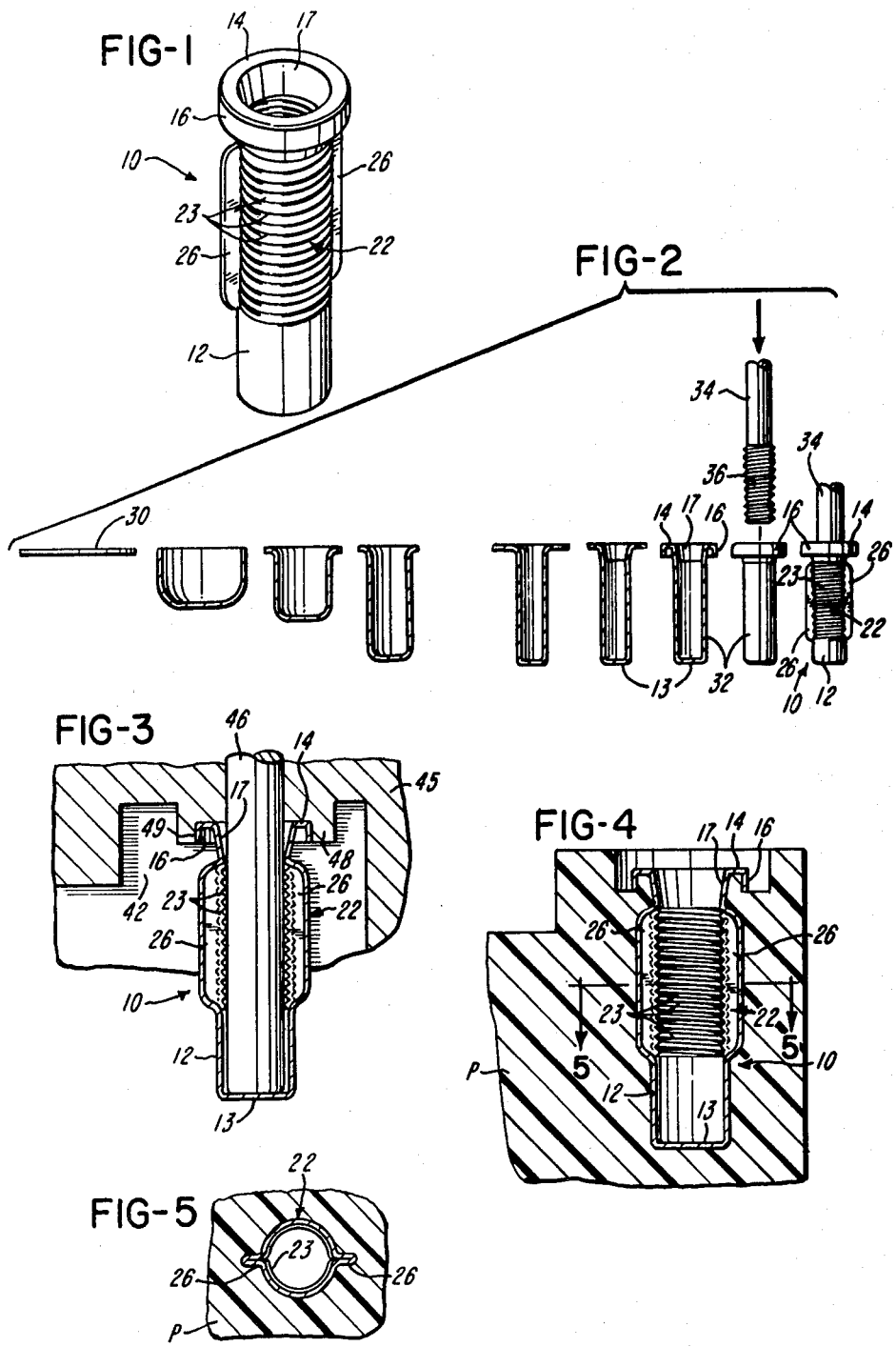

METHOD OF MAKING SHEET METAL THREADED ARTICLE

This application is a division of application Ser. No. 06/182,072, Aug. 28, 1980 now U.S. Pat. No. 4,363,581.

BACKGROUND OF THE INVENTION

In the art of injecting a plastics material into a mold cavity to form a molded plastics article or part such as, for example, a control knob or a pump housing or an enclosure cabinet, it is common to provide the part with one or more threaded holes for receiving a threaded fastener which connects the part to another article or part. When it is necessary to provide the threaded hole with internal threads having substantial strength and capable of withstanding substantial axial and torsional forces, a metal insert is commonly positioned within the mold cavity on a support stud or pin prior to injecting the plastics material. When the molded plastics part is removed from the mold cavity, the metal insert remains with the molded part and provides a threaded hole for receiving a threaded connector or fastener.

Usually, the metal insert is formed or machined from solid bar stock on an automatic screw machine, for example, as disclosed in U.S. Pat. No. 1,919,455. The machine automatically drills and taps a hole within one end of the bar stock and also roughens or knurles the outer surface of the bar stock after which the bar stock is automatically cut off to form a metal insert of predetermined length. The roughened or knurled outer surfaces of the insert receives the injected plastics material and forms a positive connection of the insert with the molded part of plastics material. When the molded part is used in a high moisture or corrosive environment, it is desirable for the metal insert to be machined from a non-corrosive material such as aluminum, brass or stainless steel. Such a material and the machining operation signficantly increase the cost of the metal insert and thereby result in increasing the cost of the molded plastic article or part.

SUMMARY OF THE INVENTION

The present invention is directed to an improved sheet metal threaded article or insert which is ideally suited for forming a high strength thread-forming hole within a part such as a part molded of a plastics material, and to the method of producing the article or insert. As used herein, the term part is intended to include any type of article, object or body of metal, wood or plastics material. As a primary advantage, the sheet metal article or insert of the invention provides for significantly decreasing the cost of forming high strength metal threads within a hole form in a molded plastics part by significantly reducing the cost of manufacturing a metal insert which has internal threads and rigidly bonds to the molded plastics material.

In general, the above features and advantages are provided in accordance with one embodiment of the invention by progressively drawing a thin sheet or disc of metal such as 0.010 inch aluminum or brass, to form an elongated body having a closed end tubular portion integrally connected to an outwardly projecting base or flange portion. Preferably, the flange portion has a cup-like configuration, and the tubular portion is crimped inwardly against a threaded mandrel to provide the tubular portion with a restricted threaded section and a pair of outwardly projecting and diametrically opposed ribs each having a thickness double the sheet metal thickness. The tubular section is then unthreaded from the mandrel.

The sheet metal thread-forming insert is supported within a mold cavity by a cylindrical pin having an outside diameter substantially the same as the inside diameter of the crimped thread section of the metal insert. When the plastics material is injected into the mold cavity, the material surrounds the crimped thread section and the outwardly projecting ribs to form a substantially high resistance to the pulling and torsional forces acting on the insert when a threaded fastener is tightened within the insert. The closed end of the tubular portion is necessary to prevent the plastics material from filling the entire tubular portion.

Other features and advantages of the invention will be apparent from the following description, the accompanying drawing and the appended claims.

BRIEF DESCRIPTION OF THE DRAWING

FIG. 1 is an enlarged perspective view of a sheet metal thread forming insert constructed in accordance with the invention;

FIG. 2 is a diagrammatic illustration of the progressive drawing and forming steps used to produce the insert shown in FIG. 1;

FIG. 3 is an axial section of the sheet metal insert shown in FIG. 1 and illustating its support within a mold cavity;

FIG. 4 illustrates the sheet metal insert as embedded within the plastics part molded within the cavity shown in FIG. 3; and FIG. 5 is a fragmentary radial section taken generally on the line 5—5 of FIG. 4.

DESCRIPTION OF THE PREFERRED EMBODIMENT

In accordance with the invention, an insert is formed of sheet matal having a thickness within a range of 0.002 to 0.050 inch such as the insert 10 which is formed of 0.010 inch brass. The insert 10 consists of a hollow body formed by a tubular portion 12 having a closed end wall 13 (FIG. 3) and an open end defined by an outwardly projecting and integrally connected annular base or flange portion 14. The flange portion 14 includes an outer cylindrical skirt portion 16 and a tapered or frusto-conical inner portion 17 which cooperate to form a cup-shaped configuration. The tubular portion 12 includes an inwardly crimped portion or section 22 which define helical threads 23 and also includes a pair of outwardly projecting and axially extending ribs 26 which are diametrically opposed. As shown in FIG. 5, each of the ribs 26 has a thickness which is double the sheet metal thickness, and the double wall thickness provides the rib with substantial rigidity.

Referring to FIG. 2, the sheet metal insert 10 is manufactured or produced by drawing a circular blank or disc 30 of the brass sheet metal in a series of progressive steps until the flange portion 14 projects from a cylindrical portion 32 having an outside diameter the same as the cylindrical end portion 12 described above. A mandrel 34 having external threads 36, is then inserted into the tubular or cylindrical portion 32, after which the cylindrical portion 32 is crimped inwardly against the mandrel 34 by a pair of mating or split external dies (not shown) to form the crimped section 22 and the threads 23 and ribs 26 within the tubular body portion 32. After the crimping operation which is the last step in forming the insert 10, the mandrel 34 is unthreaded from the insert 10 or the insert 10 is unthreaded from the mandrel 34, whichever is desired.

Referring to FIG. 3, an insert 10 is supported within a cavity 42 of an injection mold 45 by a cylindrical support pin 46 which is secured to the mold 45 and projects into the cavity 42. Preferably, the mold 45 includes an annular portion 48 which defines a counterbore or recess 49 for receiving the cup-shaped flange portion 14 of the insert 10. The outside diameter of the support pin 46 is substantially the same as the inside diameter of the threads 23 and slightly smaller than the inside diameter of the cylindrical end portion 12. The cylindrical end portion 12 has an inside diameter which provides sufficient clearance for receiving the threads of a fastener (not shown) threaded into the insert.

When the molded plastics material is injected into the mold cavity 42, the material flows into the crimped section 22 and between the threads 23 and around the ribs 26. After the plastics material hardens to form a molded plastic article or part P (FIG. 4), the part is removed from the mold cavity with the sheet metal insert 10 embedded within the part, as illustrated in FIG. 4. In accordance with one experiment, the part P consisted of a pump housing for an automatic dishwashing machine and was molded from a thermosetting plastics material with four uniformly spaced sheet metal inserts 10. The inserts were spaced to receive corresponding machine screws which secure the pump housing to an electric motor.

From the drawing and the above description, it is apparent that a sheet metal insert constructed in accordance with the invention, provides desirable features and advantages. For example, as one important feature, the sheet metal insert 10 significantly reduces the cost for forming non-corrosive metal threads within an article such as a part of a molded plastics material. In fact, the insert may be made of non-rusting brass at a lower cost than a screw machine insert made of steel, and such non-rusting is very important, particularly when disassembly is required after an extended period of time.

As another important feature, the reduced or crimped thread section 22 and the outwardly projecting double wall ribs 26 provide for positively securing the sheet metal insert within the article so that the insert will withstand substantial torsional forces as well as axial tension forces when a screw or fastener is threaded into and tightened within the insert. The thin gauge of the sheet metal insert 10 also minimizes the weight of the insert which not only contributes to the low manufacturing cost of the insert but also contributes to minimizing the weight of the molded plastic part P which receives one or more of the inserts. The sheet metal insert 10 may also be efficiently and economically produced from sheet metals other than brass sheet metal, such as cold rolled steel, stainless steel or copper, depending upon the requirements of the insert and/or the environment in which the insert is used. As mentioned above, the insert may also be used in an article formed of a material other than a plastics material, such as a metal casting or a wood base material, and may be secured within a hole in the article by adhesive or riveting or a press-fit.

While the sheet metal insert and its method of production herein described constitutes a preferred embodiment of the invention, it is to be understood that the invention is not limited to the precise sheet metal insert and method described, and that changes may be made therein without departing from the scope and spirit of the invention as defined in the appended claims.

The invention having thus been described, the following is claimed:

1. A method of making a sheet metal threaded article comprising the steps of progressively drawing a thin sheet of metal to form a hollow sheet metal body having an elongated tubular portion projecting from an integrally connected and outwardly projecting base portion defining an opening, crimping a section of said tubular portion to form helical threads and a corrugated wall configuration in axial cross-section, forming within said section at least one axially extending folded sheet metal rib having a double wall thickness, and arranging said helical threads for receiving a threaded member.

2. A method as defined in claim 1 in combination with the steps of surrounding the tubular portion of the sheet metal body with a solid material, and positioning the rib to project outwardly into the material to prevent rotation of the body within the material when the threaded member is tightened.

3. A method as defined in claim 1 and including the step of forming the rib to project radially outwardly by a distance substantially greater than the thickness of the sheet metal forming the body.

4. A method as defined in claim 3 in combination with the step of surrounding the tubular portion of the body with a body of molded plastics material.

5. A method as defined in claim 1 and including the step of forming a generally cylindrical cup-shaped portion closing the inner end of the body.

6. A method as defined in claim 5 and including the step of forming the end portion with an inner diameter slightly greater than the inner diameter of the threads.

7. A method as defined in claim 1 including the step of forming the crimped section with two of the ribs in diametrically opposed relation.

8. A method as defined in claim 1 including the step of drawing the sheet metal body to form a wall thickness within the range of 0.002 inch to 0.050 inch.

9. A method of making a sheet metal threaded article adapted to be inserted into a hardenable material to form a threaded hole within a part molded of the material, comprising the steps of progressively drawing a sheet of metal to form a sheet metal hollow body having an elongated tubular portion projecting from an integrally connected base portion defining an opening, crimping the tubular portion to form an inwardly crimped tubular section having a corrugated wall configuration in axial cross-section and defining helical threads, forming within the inwardly crimped tubular section a plurality of circumferentially spaced and axially extending folded sheet metal ribs each having a double wall thickness, the inwardly crimped tubular section being effective to retain the body within the material in response to receiving a threaded member, and the ribs being effective to prevent rotation of the body within the material when the threaded member is tightened.

10. A method as defined in claim 9 and including the steps of inserting a mandrel having outwardly projecting threads into the tubular portion prior to crimping the section of the tubular portion, and removing the mandrel after the crimping operation by relative rotation between the body and the mandrel.

11. A method as defined in claim 9 wherein only an intermediate section of the tubular portion is crimped inwardly to form the threads, and including the step of providing the tubular portion with a generally cylindrical inner end portion.

* * * * *